Jan. 6, 1925.
A. L. BUSSE
1,521,750
WEIGHING SCOOP
Filed Nov. 15, 1923    2 Sheets-Sheet 1
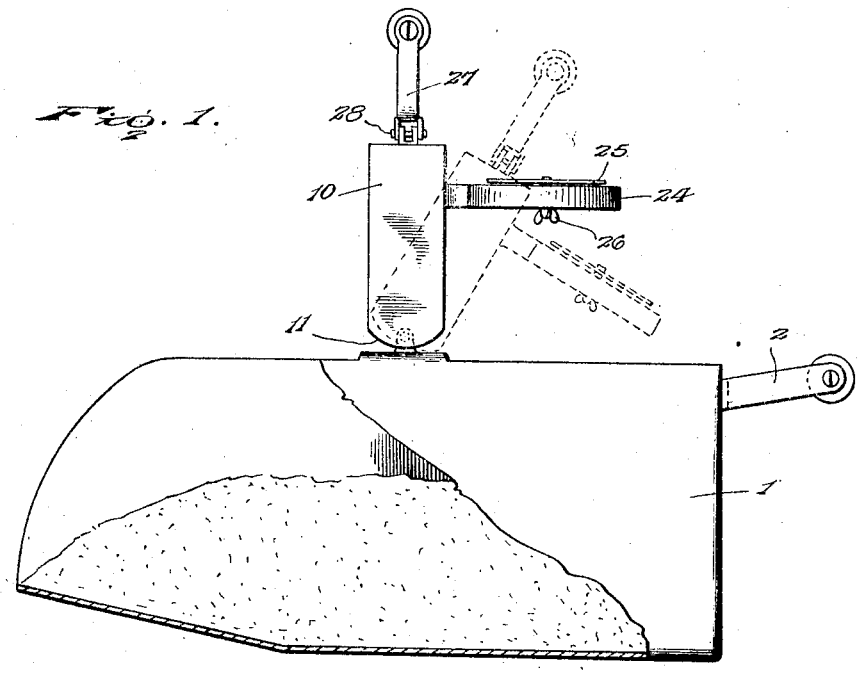
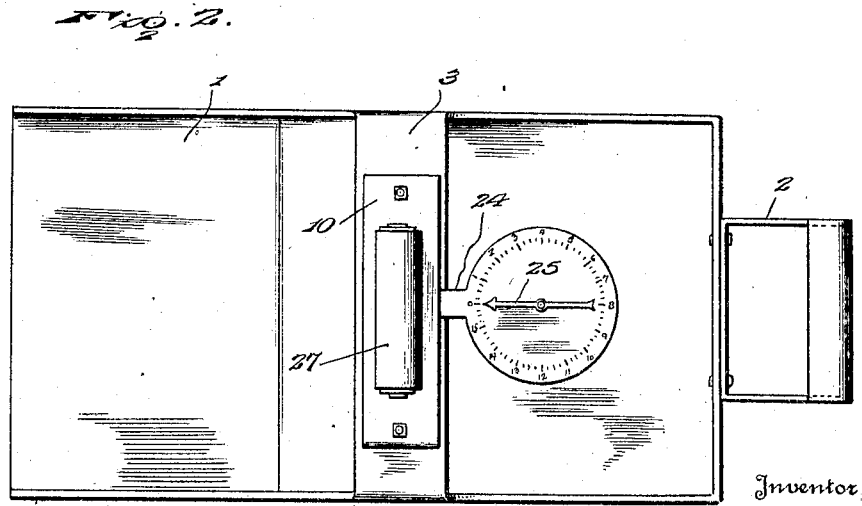
Inventor
A. L. Busse.
By Lacy & Lacy, Attorneys Jan. 6, 1925.

A. L. BUSSE 1,521,750

WEIGHING SCOOP

Filed Nov. 15, 1923

Inventor
A. L. Busse.

By Lacy & Lacy, Attorneys

Patented Jan. 6, 1925.

1,521,750

UNITED STATES PATENT OFFICE.

ARTHUR L. BUSSE, OF AMBOY, MINNESOTA.

WEIGHING SCOOP.

Application filed November 15, 1923. Serial No. 674,861.

*To all whom it may concern:*

Be it known that I, ARTHUR L. BUSSE, a citizen of the United States, residing at Amboy, in the county of Blue Earth and State of Minnesota, have invented certain new and useful Improvements in Weighing Scoops, of which the following is a specification.

My invention is a weighing scoop and has for its object the provision of a scoop by the use of which the user will be enabled to quickly weigh a commodity as a portion of the same is taken up by the scoop. Another object of the invention is to so arrange the weighing mechanism that it will not interfere with the usual manipulation of the scoop and will be so protected that it cannot become clogged and rendered inoperative by an accumulation of dust or other foreign matter upon any of its parts. Other objects of the invention will appear incidentally in the course of the following description.

In the accompanying drawings:

Figure 1 is a side elevation, partly broken away and in section, of a scoop embodying my improvements;

Fig. 2 is a plan view of the same;

Figure 3:
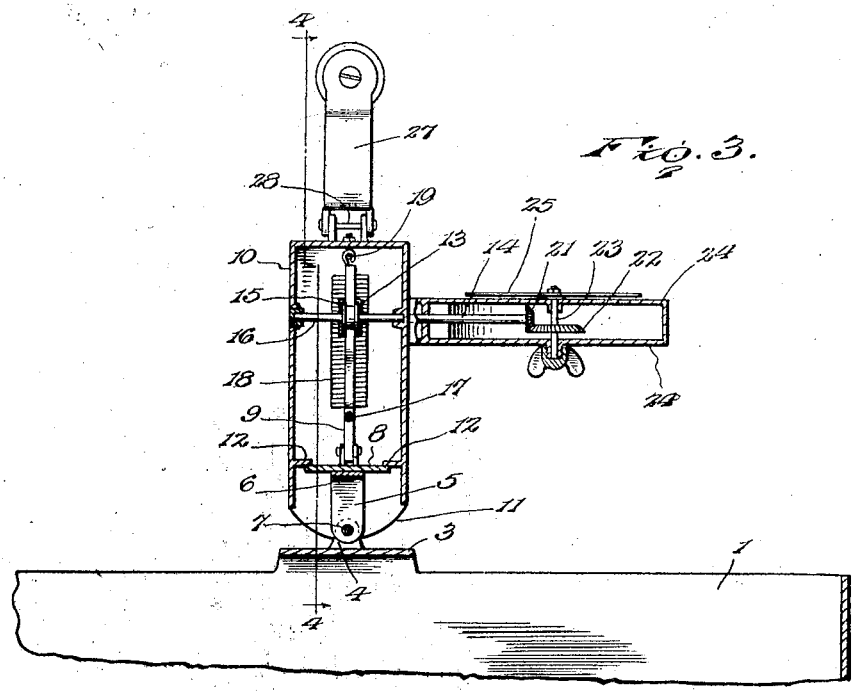
Fig. 3 is a longitudinal section through the suspending handle and housing showing the mechanism arranged therein, and
Figure 4:
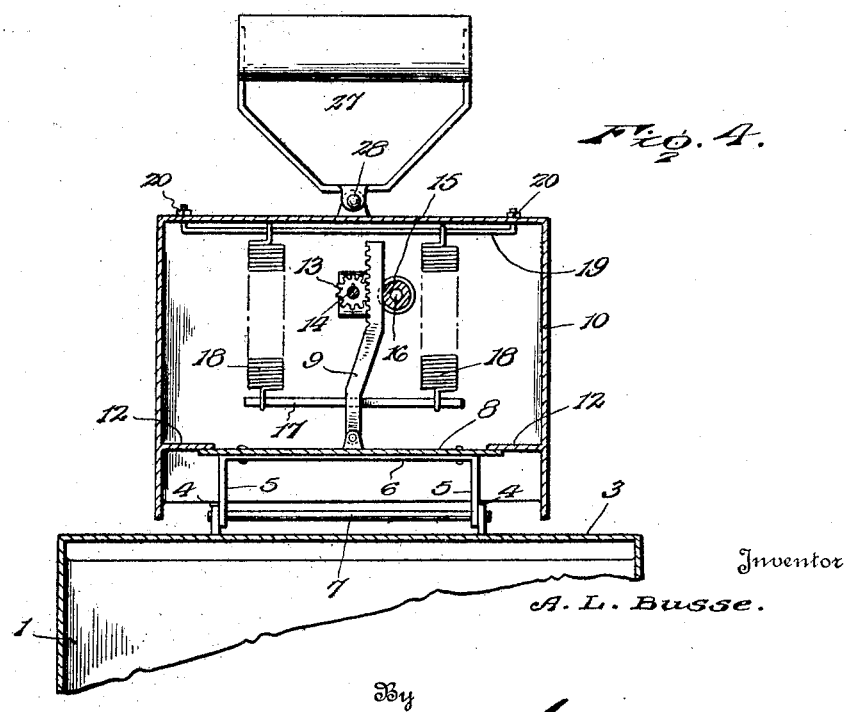
Fig. 4 is a transverse section on the line 4—4 of Fig. 3.

The scoop 1 may be of any approved design and is provided at its closed end with a rigid handle 2. Extending between the upper edges of the side plates of the scoop is a cross plate or bar 3 and on the upper side of the said bar are lugs or ears 4 between which are received the depending ends 5 of an arch bracket 6, a pivot pin or rod 7 being inserted through the said lugs and bracket ends whereby the bracket will be pivotally attached to the cross bar 3 for rocking movement in the longitudinal plane of the scoop. Upon the bracket 6 is secured a cover and stop plate 8 and at the center of the said plate upon the upper side thereof is pivoted the lower end of a rack bar 9, as shown clearly in Figs. 3 and 4, the said rack bar being capable of pivotal movement in a plane transversely of the scoop. A hollow handle or housing 10 having an open lower end is disposed around the bracket 6 and the plate 7 so as to enclose the rack bar 9 and the lower end edges of the end walls of this handle or housing are arcuate, as shown at 11, whereby the said housing or hollow handle may rock longitudinally of the scoop without coming into contact with the cross bar or plate 3. Near its lower end, this handle or housing 10 is provided with inwardly projecting flanges or stop plates 12 which normally bear upon the upper side of the plate 8 and thereby close the entire lower end of the casing to the access of flying dust or other foreign matter. The rack bar 9 terminates short of the top of the housing 10 and its upper portion is offset with respect to its pivot so that it may mesh with a pinion 13 which is secured upon a shaft 14 journaled in suitable bearings provided therefor on the sides of the housing and extending through the rear wall of the housing, by which term is meant that wall nearer the closed end of the scoop. Within the housing 10, a grooved guide roller 15 is carried by a short shaft 16 to bear against the outer edge of the rack bar 9 and hold it in mesh with the pinion 13, as clearly shown in Fig. 4. Near its lower end the rack bar carries a cross head or bar 17 which projects from the sides of the rack bar parallel with the bracket 6 and to the ends of which are attached the lower ends of coiled springs 18. In the upper end of the housing 10 is secured a bail or rod 19 having its ends threaded and upturned to project through the top of the housing, nuts 20 being mounted upon the extremities of the said rod and adapted to be turned home thereon against the top of the housing, as shown in Fig. 4. The upper ends of the springs 18 are engaged upon the bail or rod 19 and they are normally contracted so that they exert an upward pull upon the cross bar 17 and thereby hold the rack bar in its uppermost position, the upward movement being limited by the engagement of the stop and cover plate 8 against the stop flanges 12.

Upon the outer end of the shaft 14 is secured a beveled pinion 21 meshing with a beveled gear 22 carried by a vertical shaft 23 extending through and journaled in the upper and lower sides of a casing 24 which projects rearwardly from the housing 10 and is rigid therewith. The shaft 23 carries a pointer or index finger 25 at its upper end, and the upper side of the housing 24 has a dial thereon to cooperate with the said pointer or index finger. The lower end of the shaft 23 rests in a bearing nut 26 which provides a firm support for the shaft and holds the gear 22 in mesh with the pinion 21, By loosening the nut 26 the engagement of the gear 22 with the pinion 21 will be broken and the shaft may then be turned by hand to bring the pointer to the zero position on the dial while the empty scoop is held in the hand of the user. After the pointer has been thus adjusted, the nut may be turned home so as to restore the engagement of the gear 22 with the pinion 21 and maintain the parts in the operative relation.

The hollow handle or housing 10 may be provided with any desired form of grip upon its upper side and I have shown and prefer to use a grip 27 in the form of a bail or loop pivotally attached at its lower end, as at 28, to the top of the housing 10 so that the grip may have a pivotal movement in the transverse plane of the scoop and of the said housing. The pivotal connections between the grip and the housing 10, between the rack bar and the stop plate 8 and between the bracket 6 and the scoop provide for universal movement of the scoop relative to the hollow handle or housing so that, if the scoop be suspended by the grip 27, it may readily assume a properly balanced position and spilling of the contents will be avoided.

While my scoop may be employed wherever its use may seem desirable or advantageous, it is intended more particularly for dairymen who supply their stock with fixed quantities of feed by weight, proportioned to the normal production of milk. By grasping the handle 2 and the grip 27, the dairyman may easily force the scoop through or into the store of feed, a portion of which will be taken up thereby in the usual manner. By releasing the hold upon the handle 2, the filled or partly filled scoop will be held in suspended relation to the grip 27 and the weight of the feed in the scoop will overcome the tension of the springs 18 so that the scoop will move downwardly relative to the handle or housing 10 and the rack bar 9 will, of course, follow such movement, thereby rotating the pinion 13 and the shaft 14. The rotation of the shaft 14 will be transmitted through the pinion 21 and the gear 22 to the shaft 23 so that the pointer will be caused to move over the dial and come to rest at that graduation of the dial indicating the weight in the scoop. When the contents of the scoop have been discharged, the springs 18 will at once retract and return the parts to the zero position. It will be readily noted that the weighing mechanism is all disposed above the scoop so that it does not interfere in any way with the manipulation of the scoop and all the working parts are enclosed so that they are protected against an accumulation of dust and chance blows which might damage any of the working elements. The springs 18 are to be initially adjusted so that their tension will hold the pointer at the zero position of the dial. Should the device develop an inaccuracy through long-continued use, the nuts 20 may be adjusted within the limits of the structure to draw the bail or rod 19 closer to the top of the housing 10 and thereby increase the tension of the springs, as will be readily understood. The working parts are arranged compactly and so disposed that the position of the indicator may be easily noted without requiring any tilting or excessive lifting of the scoop. Should there be an overweight in the scoop, a slight upward pressure upon the rigid handle 2 will tilt the scoop with respect to the housing 10 so that some of the feed may be returned to the bin or storage receptacle while the scoop is suspended from the grip 27 and the resulting decrease in weight may be read upon the dial as the surplus material is discharged so that the salesman may instantly note when the desired weight has been reached.

Having thus described the invention, what is claimed as new is:

1. The combination of a hollow handle, a bracket housed in the lower end of the handle, a scoop pivotally attached to said bracket, stop plates within the handle to limit the movement of the bracket upwardly within the handle, yieldable connections between the bracket and the top of the handle whereby the bracket and the scoop will be held normally raised but permitted to descend under weight imposed upon the scoop, an indicator mounted on the side of the handle, and means controlled by the scoop for actuating said indicator.

2. The combination of a scoop, a bracket disposed transversely upon the top of the scoop and pivotally connected therewith, a rack bar pivoted to and rising from the said bracket, a hollow handle housing the rack bar and the said bracket, yieldable means connecting the rack bar and the hollow handle and normally holding the rack bar and the scoop in raised position, an indicator mounted on the side of the hollow handle, and means controlled by the rack bar for actuating said indicator.

In testimony whereof I affix my signature

ARTHUR L. BUSSE. [L. S.]